United States Patent [19]
Wong et al.

[11] Patent Number: 5,957,985
[45] Date of Patent: Sep. 28, 1999

[54] FAULT-RESILIENT AUTOMOBILE CONTROL SYSTEM

[75] Inventors: William Wong, Redmond; Lawrence W. Lee, Bellevue, both of Wash.

[73] Assignee: Microsoft Corporation, Redmond, Wash.

[21] Appl. No.: 08/771,343

[22] Filed: Dec. 16, 1996

[51] Int. Cl.⁶ .............................. B60R 16/02; G06F 11/00
[52] U.S. Cl. ................................ 701/33; 701/29; 701/32; 395/182.11
[58] Field of Search ................................ 701/29, 32, 33, 701/34, 35; 364/131, 132, 134, 140; 370/217, 221, 241, 242, 245; 395/185.01, 183.17, 182.11, 183.04

[56] References Cited

U.S. PATENT DOCUMENTS

| | | | |
|---|---|---|---|
| 3,623,014 | 11/1971 | Doelz et al. | 395/182.04 |
| 4,534,025 | 8/1985 | Floyd | 370/449 |

(List continued on next page.)

FOREIGN PATENT DOCUMENTS

| | | |
|---|---|---|
| 0 033 664 | 12/1981 | European Pat. Off. . |
| 0 277 302 | 10/1988 | European Pat. Off. . |
| WO 9602883A1 | 2/1996 | WIPO . |

OTHER PUBLICATIONS

Inoue et al., "Multiplex Systems for Automotive Integrated Control," *Multiplex Technology Applications in Vehicle Electrical Systems*, SP–954, No. 930002, 1993 (month is not available).

Azuma et al., "Development of a Class C Multiplex Control IC," *Multiplex Technology Applications in Vehicle Electrical Systems*, SP–954, 1993 (month is not available).

Mathony et al., "Network Architecture for CAN," *Multiplex Technology Applications in Vehicle Electrical Systems*, SP–954, No. 930004, 1993 (month is not available).

(List continued on next page.)

*Primary Examiner*—Tan Q. Nguyen
*Attorney, Agent, or Firm*—Lee & Hayes, PLLC

[57] ABSTRACT

A fault-resilient automobile control system integrates diverse and separate automobile components and provides fault-tolerance to component failure. The automobile control system includes a master control unit (MCU) electrically coupled via a primary data communications bus to the electronic automobile components. The MCU is master of the bus and manages data flow over the bus among the electronic automobile components. The MCU can be configured with a routing table to route data monitored in one component to one or more other components. The MCU is also capable of performing the same functions as those performed by local controllers at the electronic components. During initialization, driver software for all of the local controllers is downloaded and storded at the MCU. In the event that a local controller fails, the MCU executes the driver software for the failed controller to remotely control the electronic automobile component in place of the failed local controller. Switching logic is installed at each of the electronic components to selectively route data to the primary bus, circumventing the failed controller. The automobile control system has a secondary control unit (SCU) electrically coupled to the MCU via the primary bus. The SCU is a standalone computer that supports clients and other devices on a secondary support bus. The SCU is also configured to backup the MCU. During normal operation, the SCU is subordinate to and controlled by the MCU on the primary bus. In the event that the MCU fails, however, the SCU assumes control of the data communications network and manages the data flow among the electronic automobile components.

40 Claims, 7 Drawing Sheets

U.S. PATENT DOCUMENTS

| | | | |
|---|---|---|---|
| 5,313,584 | 5/1994 | Tickner et al. | 395/857 |
| 5,351,041 | 9/1994 | Ikata et al. | 370/451 |
| 5,377,322 | 12/1994 | Ogura et al. | 395/185.1 |
| 5,481,456 | 1/1996 | Ogura | 364/132 |
| 5,594,646 | 1/1997 | Ito et al. | 701/35 |

OTHER PUBLICATIONS

Szydolowsik, "A Gateway for CAN Specification 2.0 Non–Passive Devices," *Multiplex Technology Applications in Vehicle Electrical Systems*, SP–954, No. 93005, 1993 (month is not available).

Neumann et al., "Open Systems and Interfaces for Distributed Electronics in Cars (OSEK)," *Automotive Multiplexing Technology*, SP1070, No. 95021, 1995 (month is not available).

Emaus, "Aspects and Issues of Multiple Vehicle Networks," *Automotive Multiplexing Technology*, SP–1070, No. 950293, 1995 (month is not available).

FAULT-RESILIENT AUTOMOBILE CONTROL SYSTEM

TECHNICAL INVENTION

This invention relates to computer control systems for automobiles.

BACKGROUND OF THE INVENTION

Modern automobiles are typically equipped with multiple independent electronic components. For instance, most modern automobiles have an electronic engine control system, a computerized antilock braking system (ABS), a vehicle safety system, a lighting control system, a climate control subsystem, and a sound system. The engine control system usually employs an electronic controller to in maximize fuel economy and minimize harmful emissions. The antilock braking system uses electronic sensors and microprocessors to slow an automobile at an optimal rate while preventing skidding. The vehicle safety system has a crash response controller that is triggered during a crash to deploy one or more airbags.

Some recent automobile models are equipped with a navigation system that employs a global positioning system (GPS) receiver to receive positioning signals from a satellite network. The navigation system computes coordinates that locate the vehicle over the surface of the earth with regard to longitude, latitude, and altitude. Cellular communication systems have also been introduced into automobiles to enable the driver or occupant to transact telephone calls from their vehicle. Most late model automobiles are also constructed with a diagnostic system that analyzes the performance of the automobile engine, air and heating system, and other components (1996 or later for OBD II, 1993 or later for OBD I).

While these various electronic components have proven useful, there is a drawback in that all of them are entirely separate and independent from one another. Generally, these subsystems are supplied by different manufacturers.

These disparate components often employ proprietary, dedicated processors or ASICs (application specific integrated circuits) that have different system architectures and execute incompatible proprietary software. The components have limited or no communications with one another.

Some strides have been made to integrate the components. Typically, the proposals call for each of the distributed components to be connected to a data bus, such as a CAN (Controller Area Network) protocol bus. Designers have theorized different multiplexing protocols and token passing protocols to facilitate communication over the bus. For more information on these proposals, the reader is directed to the following articles which appear in a publication from the Society of Automotive Engineers (SAE): Inoue et al., "Multiplex Systems for Automotive Integrated Control," *Multiplex Technology Applications in Vehicle Electrical Systems*, SP-954, No. 930002, copyright 1993; Azuma et al., "Development of a Class C Multiplex Control IC," *Multiplex Technology Applications in Vehicle Electrical Systems*, SP-954, No. 930003, copyright 1993; Mathony et al. "Network Architecture for CAN," *Multiplex Technology Applications in Vehicle Electrical Systems*, SP-954, No. 930004, copyright 1993; Szydolowski, "A Gateway for CAN Specification 2.0 Non-Passive Devices," *Multiplex Technology Applications in Vehicle Electrical Systems*, SP-954, No. 930005, copyright 1993; al., "Open Systems and Interfaces for Distributed Electronics in Cars (OSEK)," *Automotive Multiplexing Technology*, SP-1070, No. 950291, copyright 1995; and Emaus, "Aspects and Issues of Multiple Vehicle Networks," *Automotive Multiplexing Technology*, SP-1070, No. 950293, copyright 1995.

While there has been some progress at interconnecting electronic components in a distributed system via a communication link, there is no commonly accepted standard for the main vehicle system bus and bus interface. Additionally, even in the distributed architecture, the electronic components are individually vulnerable to unrecoverable failure. When a component experiences an electronics failure, such as a failed controller, the component is either rendered entirely useless or reduced to a safe, but otherwise suboptimally performing unit.

The inventors have developed a fault-resilient system which solves these problems.

SUMMARY OF THE INVENTION

This invention concerns a fault-resilient automobile control system that integrates diverse and separate automobile components and tolerates component failure.

According to one aspect of this invention, the fault-resilient automobile control system includes a master control unit (MCU) electrically coupled via a data communications bus to the electronic automobile components. The master control unit has a computer processor programmed to manage data flow over the data communications bus among the electronic automobile components. The MCU defines and synchronizes initialization of the bus communications.

According to an aspect of this invention, the MCU maintains a routing table to facilitate resource and information sharing among the components. The routing table is constructed during initialization to define how data derived at one electronic component is routed to one or more other components. During operation, the MCU collects data from the source electronic components and routes the data to destination electronic components according to the routing table. As an example of this data sharing, data collected by an antilock braking system when an automobile is slowing down might be routed to an automatic transmission system for use in determining whether to downshift.

According to another aspect of this invention, the MCU's computer processor is programmed to perform the same functions as those performed by local controllers at the electronic components. During initialization, the driver software for all of the local controllers is downloaded and stored at the MCU. In the event that a local controller fails, the master control unit executes the driver software for the failed controller to remotely control the electronic automobile component in place of the failed local controller.

Switching logic is provided at each of the electronic components. The switching logic selectively routes data either to the local controller, assuming the controller is functioning properly, or over the data communications bus to the MCU, circumventing the controller, when the controller is not functioning properly.

According to yet another aspect of this invention, the fault-resilient automobile control system has a secondary control unit (SCU) electrically coupled to the master control unit via the data communications network. The secondary control unit has a computer processor that supports many user-based components, such as an entertainment system or a cellular communications system. The SCU's computer processor is also programmed with a backup copy of the MCU's data communications code to manage the data flow among the electronic automobile components. During normal operation, the SCU is subordinate to and controlled by the MCU on the data communications bus. In the event that the master control unit fails, however, the secondary control unit assumes control of the data communications bus and manages the data flow among the electronic automobile components.

Accordingly, the fault-resilient automobile control system affords fault tolerance for all of the components as well as for the MCU itself.

According to another aspect of this invention, the master control unit and the secondary control unit are general purpose computers which run an open platform multitasking operating system. The open architecture affords tremendous flexibility and adaptability to the addition of new automobile components or the reconfiguration of old components.

BRIEF DESCRIPTION OF THE DRAWINGS

The same reference numerals are used throughout the drawings to reference like components and features.

DETAILED DESCRIPTION OF THE PREFERRED EMBODIMENT

Figure 1:
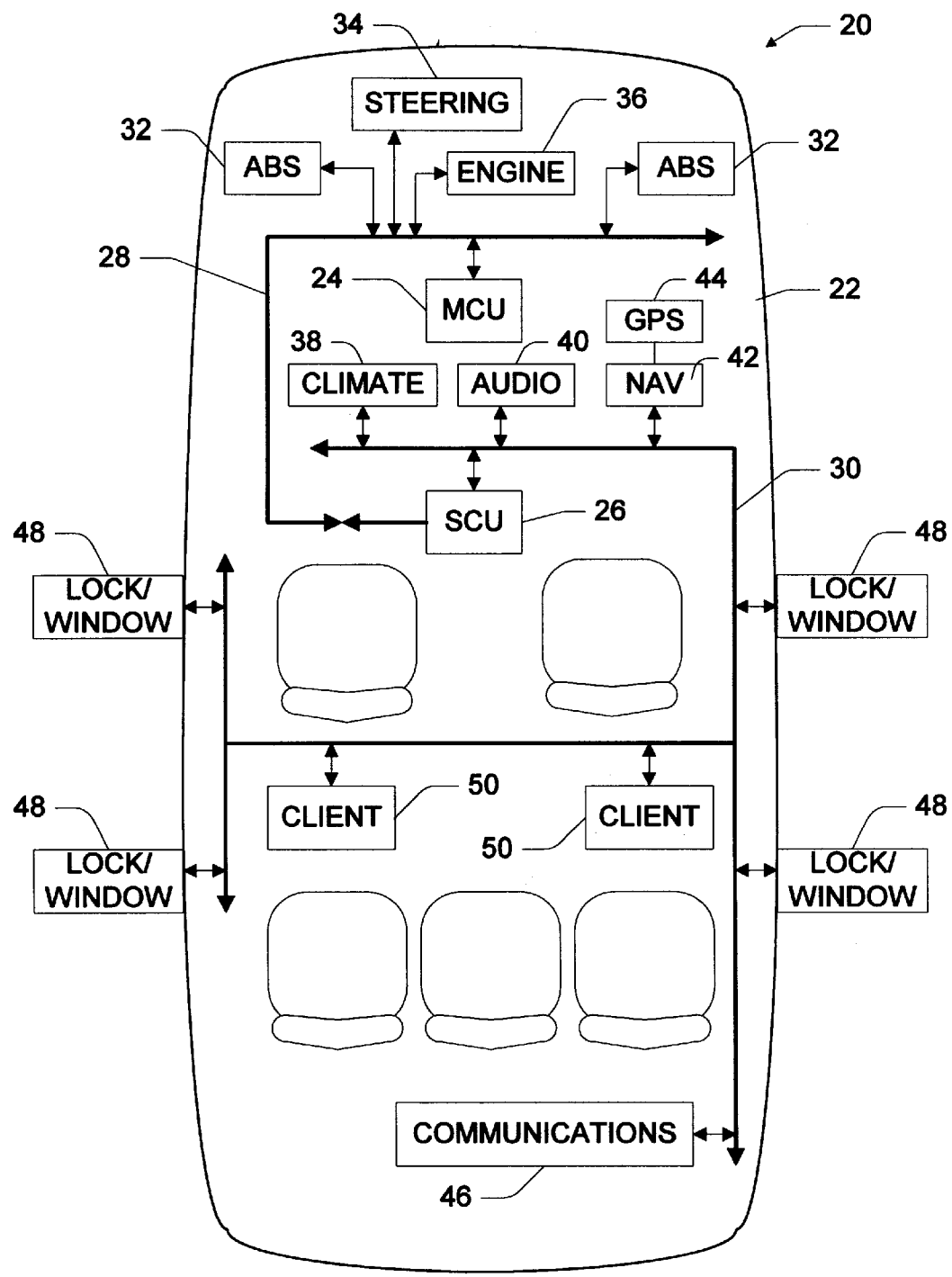
FIG. 1 is a diagrammatic illustration of a fault-resilient automobile control system implemented in an automobile according to one exemplary aspect of this invention.

FIG. 1 shows an automobile control system 20 constructed in an automobile 22 according to one exemplary implementation of this invention. The automobile control system 20 has a master control unit (MCU) 24 and a secondary control unit (SCU) 26. A dual bus structure consisting of a primary data communications bus 28 and a secondary support bus 30 provide an infrastructure for data communications in the control system 20. The primary bus 28 may be implemented using any vehicle bus design currently employed or contemplated by automobile manufactures, such as CAN, ABUS, VAN, J1850, K-BUS, P-BUS, IBUS, USB, P1394, and so forth. The support bus 30 may be implemented as any standard computer data bus, such as PCI, USB, P1394, and the like.

The master control unit 24 and the secondary control unit 26 are interconnected through the primary vehicle bus 28. In addition, various electronic automobile components are connected to the master control unit 24 via the primary bus 28. In this illustration, the electronic components include an antilock braking system (ABS) 32, an electronic steering system 34, and an engine control system 36. However, other components may likewise be connected to the primary vehicle bus 28, such as a security/alarm system, a diagnostic system, a lighting control system, a fuel injection system, an automatic transmission system, and so forth. In addition, the electronic components shown in FIG. 1 are intelligent components in that they each have their own local controller, typically embodied as a microprocessor. The automobile might further include non-intelligent electronic components which do not have local processing capabilities, as is explained below with reference to FIGS. 6–8.

FIG. 1 shows a number of devices connected to the support bus 30. These devices include a climate control system 38, an audio system 40, a navigation system 42 with global positioning system (GPS) antenna 44, and a cellular communications system 46. Door locks and window controls 48 are also connected to the support bus 30. The secondary control unit 26 is master of the support bus 30. The SCU 26 is also configured as a server to multiple clients 50. The clients 50 can be, for example, small hand held or laptop game computers having visual display screens and audio sound cards to provide multimedia entertainment. The SCU 26 serves in-car entertainment in the form of movies and games to the clients 50 for the passengers enjoyment.

In general, during normal operation of the automobile control system 20, the master control unit 24 is the master of the primary vehicle bus 28. All electronic components 32–36, as well as the secondary control unit 26, are slaves to master control unit 24. The master control unit 24 manages data flow among the electronic components 32–36 and facilitates resource and information sharing. In addition, the master control unit 24 provides backup for the intelligent electronic components in the event that any of them fail, and also performs data processing and control functions for non-intelligent electronic components.

Figure 2:
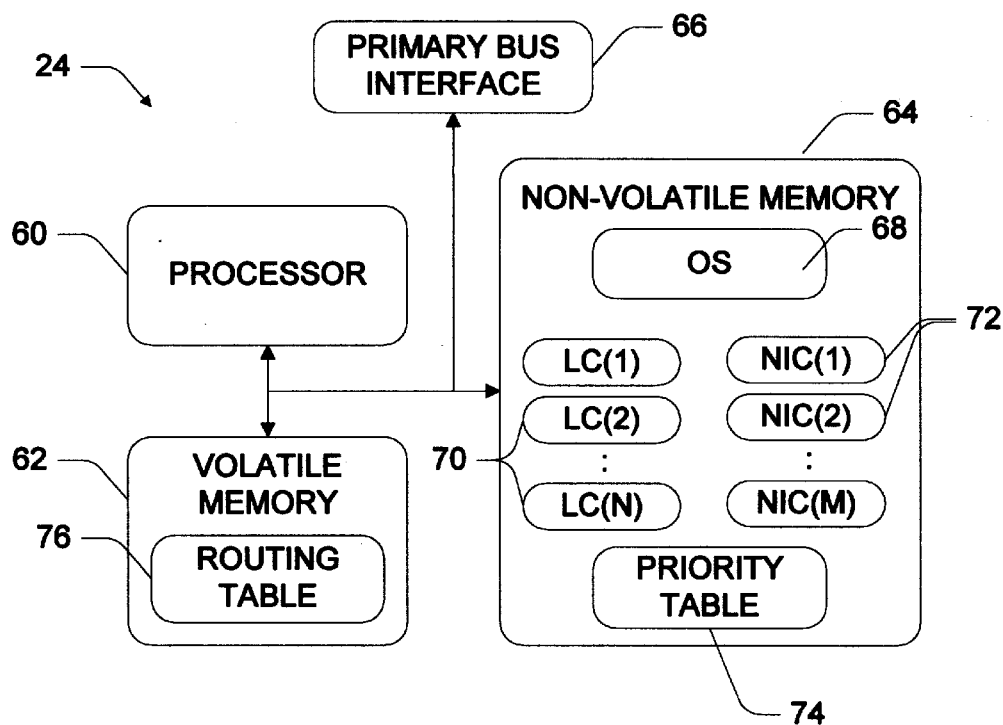
FIG. 2 is a block diagram of a master control unit employed in the automobile control system.

FIG. 2 shows the master control unit 24 in more detail. It has a computer processor 60, volatile memory 62 (e.g., RAM), and non-volatile memory 64 (e.g., ROM, Flash). The master control unit 24 also has a bus interface 66 to provide access to the primary bus 28. The master control unit 24 runs an open platform operating system 68, which is shown stored in non-volatile memory 64. During runtime, the operating system 68 loads into volatile memory 62 and executes on processor 60. The open platform operating system 68 is preferably a real-time, multitasking operating system capable of supporting "plug-and-play" system configuration and providing high stability, security, and efficiency. One preferred operating system is a Windows® brand operating system sold by Microsoft Corporation, such as Windows CE® or Windows NT® operating systems.

The operating system 68 has network management capabilities which enable the master control unit 24 to manage data flow over the primary bus 28 among the electronic components 32–36 and the secondary control unit 26. The master control unit 24 initializes the network communication and register subsystem, and handles component configuration. During operation, the master control unit 24 preferably controls the data flow in a deterministic manner, accepting only predefined data from the electronic components. This is advantageous in that the master control unit provides protection to individual electronic components that are connected on the primary vehicle bus 28 against unexpected or unauthorized commands. In addition, the networking capabilities enable the master control unit 24 to monitor for deletion or addition of electronic components to the primary bus 28.

The MCU 24 contains driver software, referenced generally as number 70, for all of the electronic components connected to the primary bus 28. The electronic components register with the MCU 24 during initialization, or as they are added to the bus. The components' software code 70 may already exist in the MCU memory in dynamic link library (DLL) form which can be linked to the MCU system as components are registered. If the software code of one or more components do not exist in the DLL, a part of this registration involves downloading the software code used to run the components over the primary bus 28 to the master control unit 24. FIG. 2 shows driver software 70 for local controllers LC(1), LC(2), . . . LC(N) of intelligent electronic components (i.e., components with local controllers) stored in the non-volatile memory 64. FIG. 2 also shows executable code for the non-intelligent components NIC(1), NIC(2), . . . , NIC(M) (i.e., components without local controllers), referenced general as number 72, stored in non-volatile memory 64.

In the instance that a local controller of an intelligent component fails, the MCU 24 assumes control of that component and assigns to the failed component a highest execution priority to ensure uninterrupted performance. For instance, if the processor in the ABS fails, the MCU 24 runs the local controller driver, say driver LC(1), to perform the functions of the failed processor for the antilock braking system. Switching logic is provided at the failed component to transfer control to the MCU. Once the MCU 24 assumes control of a component, the MCU 24 performs its data flow management functions on a resource available basis.

The operating system 68 is a real-time, deterministic operating system that has the processing power capable of concurrently supporting multiple critical components. In the event that multiple components fail, the MCU 24 employs a priority table 74 which specifies an ordered ranking for executing the failed devices. The priority table 74 is constructed during initialization as the components register with the MCU 24. During registration, the MCU 24 assigns a priority rating to each of the electronic automobile components and stores the association in a table in the non-volatile memory 64. The priority rating is associated through the table's data structure to identifiers for the driver software 70 and executable code 72. The priority is predetermined by the automobile manufacturer based upon which components register with the MCU 24. It is noted that the priority table 74 may alternatively be reconstructed from scratch each start cycle and maintained in volatile memory 62.

Once constructed, the priority table 74 establishes a priority of operation in the event that more than one component fails. The priority table 74 assigns processing resources disproportionately to the highest priority rated component first, followed in order by the lower priority rated components. For instance, the driver software for the antilock braking system might be assigned the highest priority rating to ensure that the MCU 24 has sufficient resources to handle the braking system in the event it fails, even though other components (such as the security system) might also fail during that time. In one implementation, the components are assigned a "critical" rating, meaning that they are given the highest priority available, a "normal" rating, meaning that they can be given a lower priority if a critical component concurrently fails, or a "lowest" rating, meaning that they will receive MCU resources only after all components with higher priority have been handled.

The MCU 24 also maintains a routing table 76 in volatile memory 62. The routing table 76 is constructed during initialization to define which data is passed and shared among the active electronic components. For instance, the table might define a data structure having a source field that contains an identifier of an electronic component from where certain data is generated, and a destination field that contains a list of one or more components to which the certain data is to be routed by the MCU 24. For instance, data collected by the ABS 32 (i.e., a source component) concerning wheel speed might be routed to the automatic transmission control system and the fuel injection control system (i.e., destination components). The source and destination fields are correlated in the table 76. During operation, the MCU 24 collects data from the electronic components identified in the source fields (such as the ABS), indexes the routing table 76 to corresponding destination fields, and routes the data to the electronic components (such as the automatic transmission control system or fuel injection system) listed in the corresponding destination fields. The routing table enables the MCU 24 to facilitate data sharing among the components.

Figure 3:
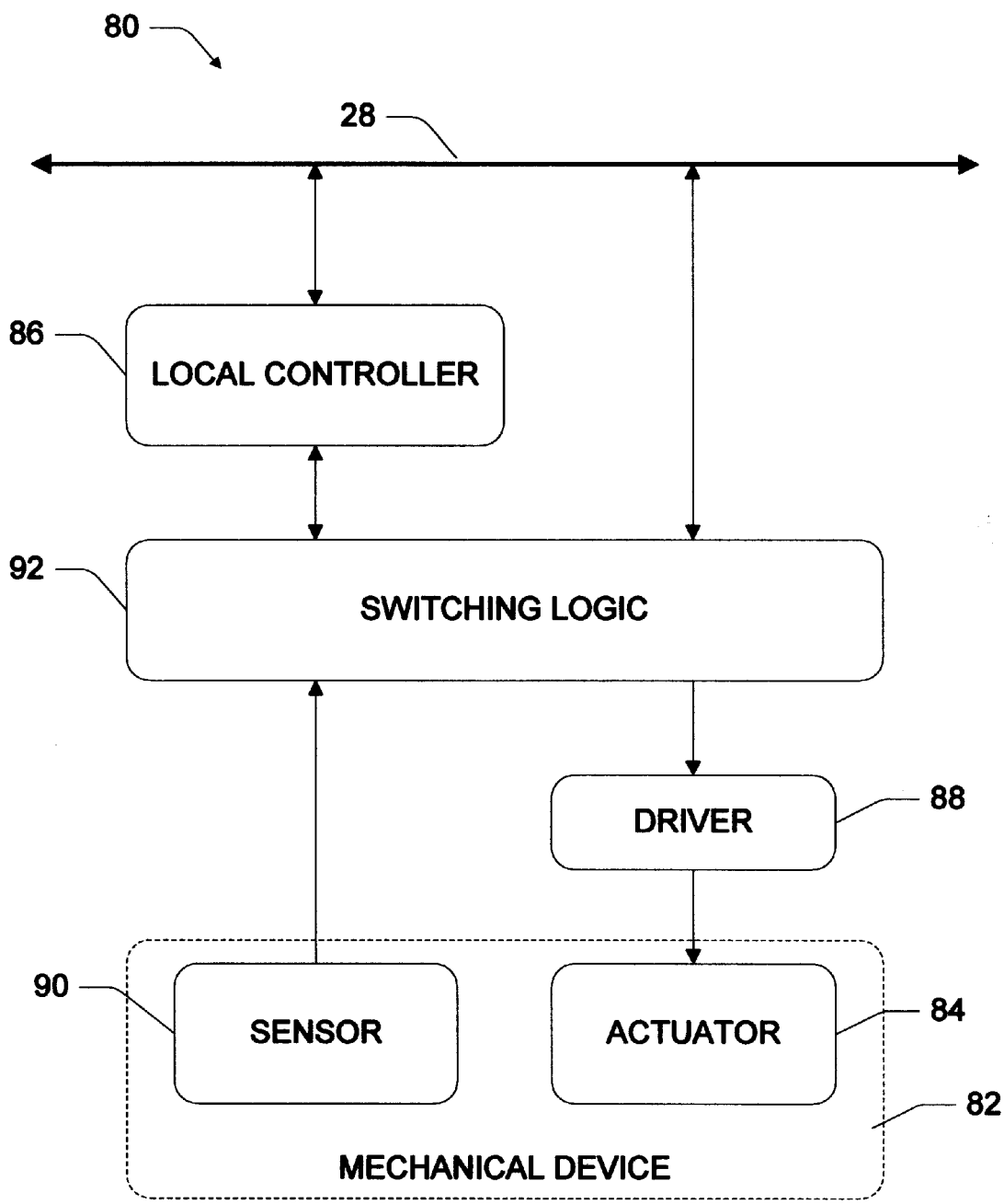
FIG. 3 a block diagram of an exemplary electronic component employed in the automobile control system.

FIG. 3 shows an exemplary construction of an intelligent electronic automobile component, referenced generally as number 80. The automobile component 80 generally comprises a mechanical device 82 (such as brakes, engine, transmission, etc.) which is controlled through an electronically-controlled actuator 84. A local controller 86 is coupled through a driver 88 to send electronic command signals that control the actuator and hence, the mechanical apparatus 82. The local controller 86 can be implemented as a microprocessor, digital signal processor, dedicated ASIC (application specific integrated circuit), or the like. A sensor 90 monitors the mechanical apparatus 82 and generates data indicative of operation to provide feedback information to the local controller 86. The local controller 86 also has an interface to the primary vehicle bus 28. This construction of the electronic automobile component is customary and known in the art.

An aspect of this invention is to modify the existing electronic automobile component 80 to include switching logic 92. In the FIG. 3 illustration, the switching logic 92 is interfaced between the local controller 86 and the driver 88 and sensor 90. The switching logic 92 also has its own connection to the primary bus 28 which bypasses the local controller 86. The switching logic 92 selectively routes data received from the sensor 90 to either the local controller 86 or directly to the primary bus 28. The switching logic 92 directs the data to the local controller 86 when the controller is functioning properly. In the event that the controller is not functioning properly, however, the switching logic 92 routes data flow to the bus 28, circumventing the failed local controller 86, so that the MCU 24 can control the component over the primary bus 28.

Figure 4:
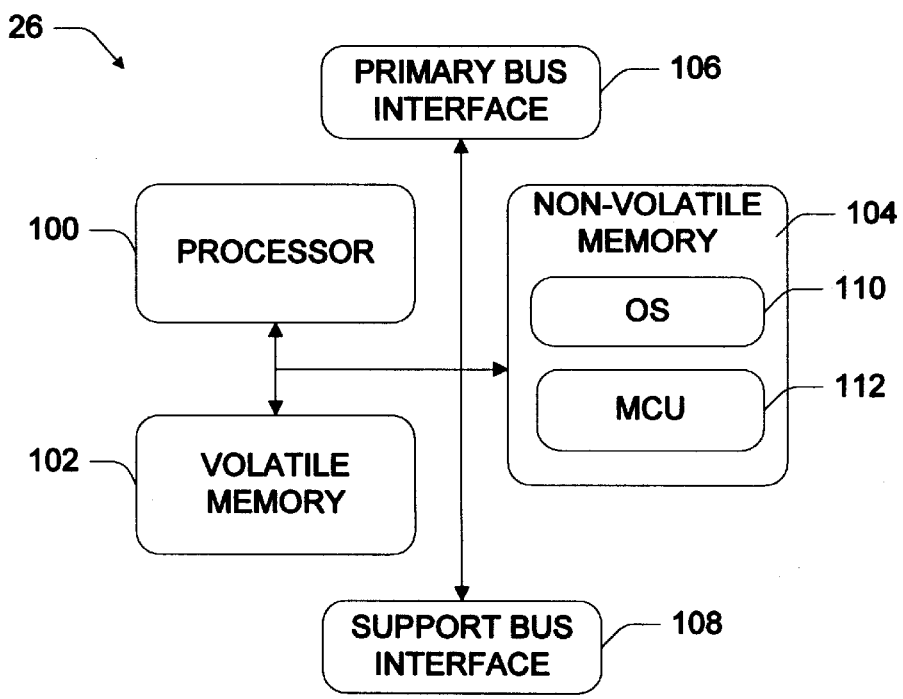
FIG. 4 is a block diagram of the secondary control unit employed in the automobile control system.

FIG. 4 shows the secondary control unit 26 in more detail. The secondary control unit 26 is preferably a general purpose computer capable of supporting multiple applications. The SCU 26 has a processor 100 (e.g., SH3 from Hitachi, Ltd. or Pentium® microprocessor from Intel Corporation), volatile memory 102 (e.g., RAM), and non-volatile memory 104 (e.g., ROM, Flash, hard disk, etc.). The SCU 26 has a primary bus interface 106 to provide access to the primary vehicle bus 28 and a support bus interface 108 to provide access to the support bus 30.

The SCU 26 runs an open platform operating system 110 which supports multiple applications. Using an open platform operating system and an open computer system architecture, various software applications and hardware peripherals can be supported by the SCU 26 on the support bus 30. This is advantageous in that the software applications do not need to be dedicated to specially designed embedded systems. The open hardware architecture is preferably running a multitasking operating system that employs a graphical user interface. One preferred operating system is a Windows® brand operating system sold by Microsoft Corporation, such as Windows 95® or Windows NT® or other derivative versions of Windows®. A multitasking operating system allows simultaneous execution of multiple applications.

The SCU 26 might also include at least one storage drive-such as a CD ROM drive, PC Card drive, or a floppy disk drive-which permits use of portable storage media. A CD ROM drive enables application-related CDs, as well as musical, video, game, or other types of entertainment CDs. The SCU 26 is constructed and sized to mount in the dashboard of the automobile. A detailed explanation of one suitable construction of a secondary control unit 26 is described in U.S. Pat. No. 5,794,164 entitled "Vehicle Computer System," which issued Aug. 11, 1988, in the names of Richard D. Beckert, Mark M. Moeller, and William Wong. This application is assigned to Microsoft Corporation and is hereby incorporated by reference.

The secondary control unit 26 is slave to the master control unit 24 on the vehicle bus 28, but is a master to clients 50 and other electronic components 38–48 connected to the support bus 30. The SCU 26 can function as a server to the clients 50, such as to serve games, music, movies or other forms of entertainment.

The SCU 26 maintains an up-to-date copy of executable code 112 run by the MCU 24 to manage data flow among the components. The MCU code 112 is downloaded to the SCU 26 during initialization and stored in the non-volatile memory 84. In the event that the MCU 24 fails, the secondary control unit 26 executes the MCU code 112 to assume the master responsibility of data flow management on the primary bus 28.

Figure 5:
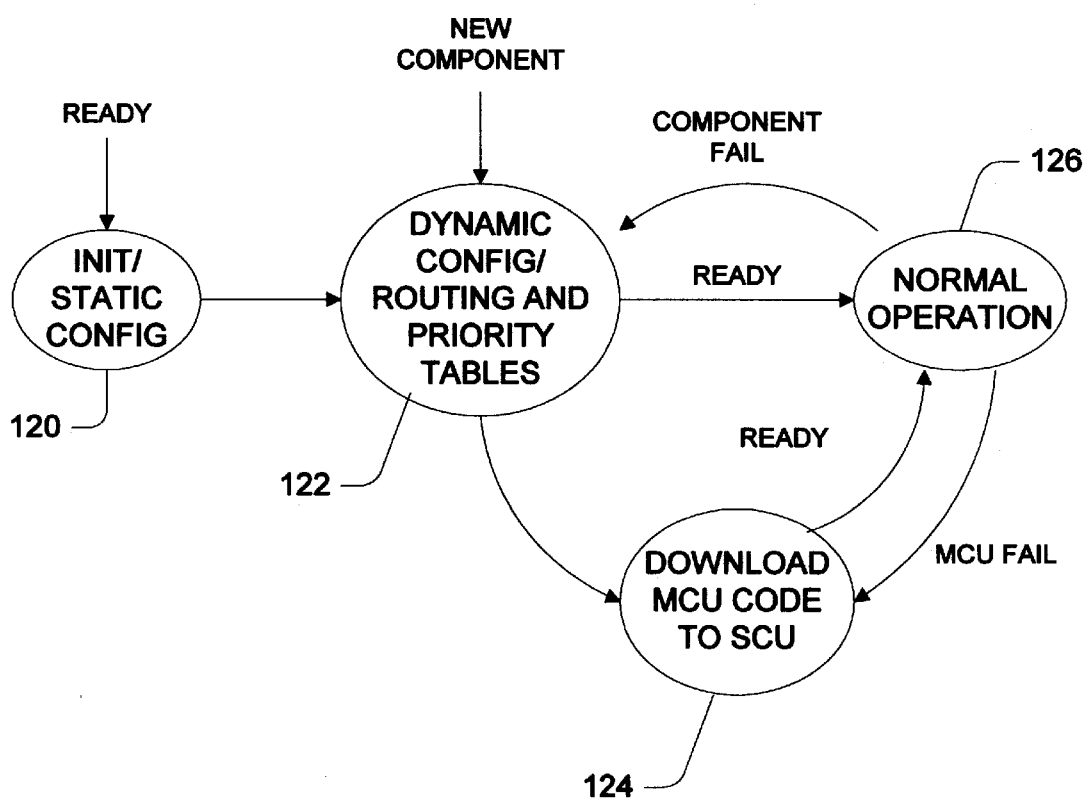
FIG. 5 is a state diagram showing initialization and execution of the automobile control system.

FIG. 5 shows a state diagram of the automobile control system. The startup is triggered by turning on power to the automobile. At state 120, the master control unit 24 runs an initialization procedure to boot the operating system and loads from non-volatile memory all of the driver software 70 for intelligent components and executable code 72 for non-intelligent components into the volatile memory. These software programs correspond to components that are pre-known to the MCU 24 through previous registration. At state 122, the MCU 24 runs a dynamic configuration procedure which checks if any new component has been added to or old components removed from the primary vehicle bus. The MCU 24 polls the existing components and sends out requests for new components. Components which are still attached and functioning respond to the MCU 24. New components also respond and subsequently register with the MCU 24. Components that have been removed, of course, do not respond to the polling signals.

Once the components are identified and accounted for, the MCU 24 constructs the priority table 74 and stores it in non-volatile memory 104. The MCU 24 also constructs the routing table 76 based upon the existing active components.

At state 124, the MCU 24 downloads a copy of its code to the SCU 26 over the primary bus 28. Following this initialization sequence, the MCU enters its normal operating state 126. If the MCU fails, control is shifted back to the SCU 26 (as indicated by the MCU FAIL arrow). If the MCU is subsequently restored, control is returned to the MCU 24 (as indicated by the READY arrow).

Also at state 126, the MCU 24 continuously monitors for failure of any electronic components. If the MCU 24 detects a component failure, the MCU 24 reconfigures the routing and priority tables dynamically and assumes control of the failed component (as indicated by the COMPONENT FAIL arrow back to state 122).

Figure 6:
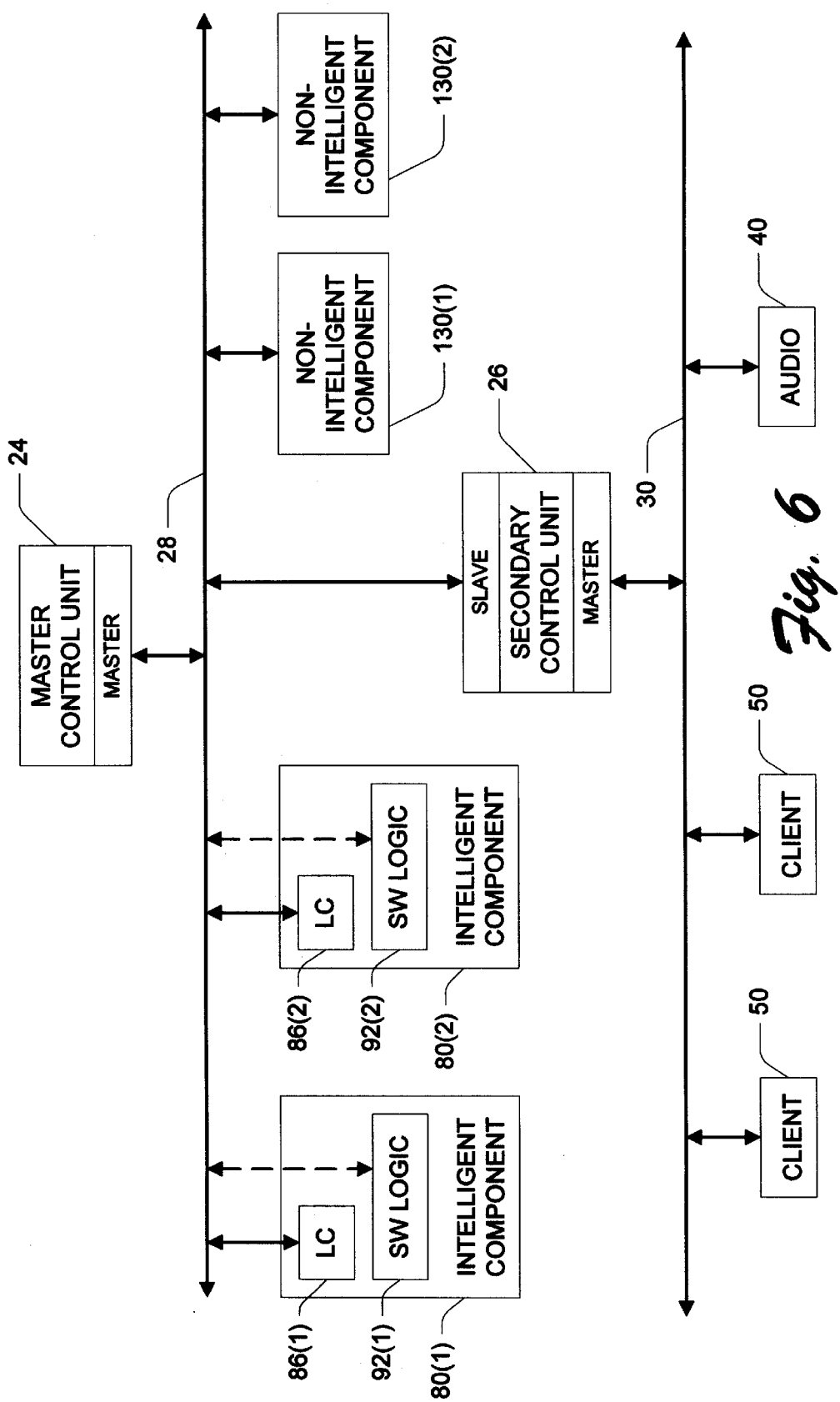
FIG. 6 is a block diagram of the automobile control system showing a master/slave relationship between the master control unit, the secondary control unit, and the multiple electronic components during normal operation.
Figure 7:
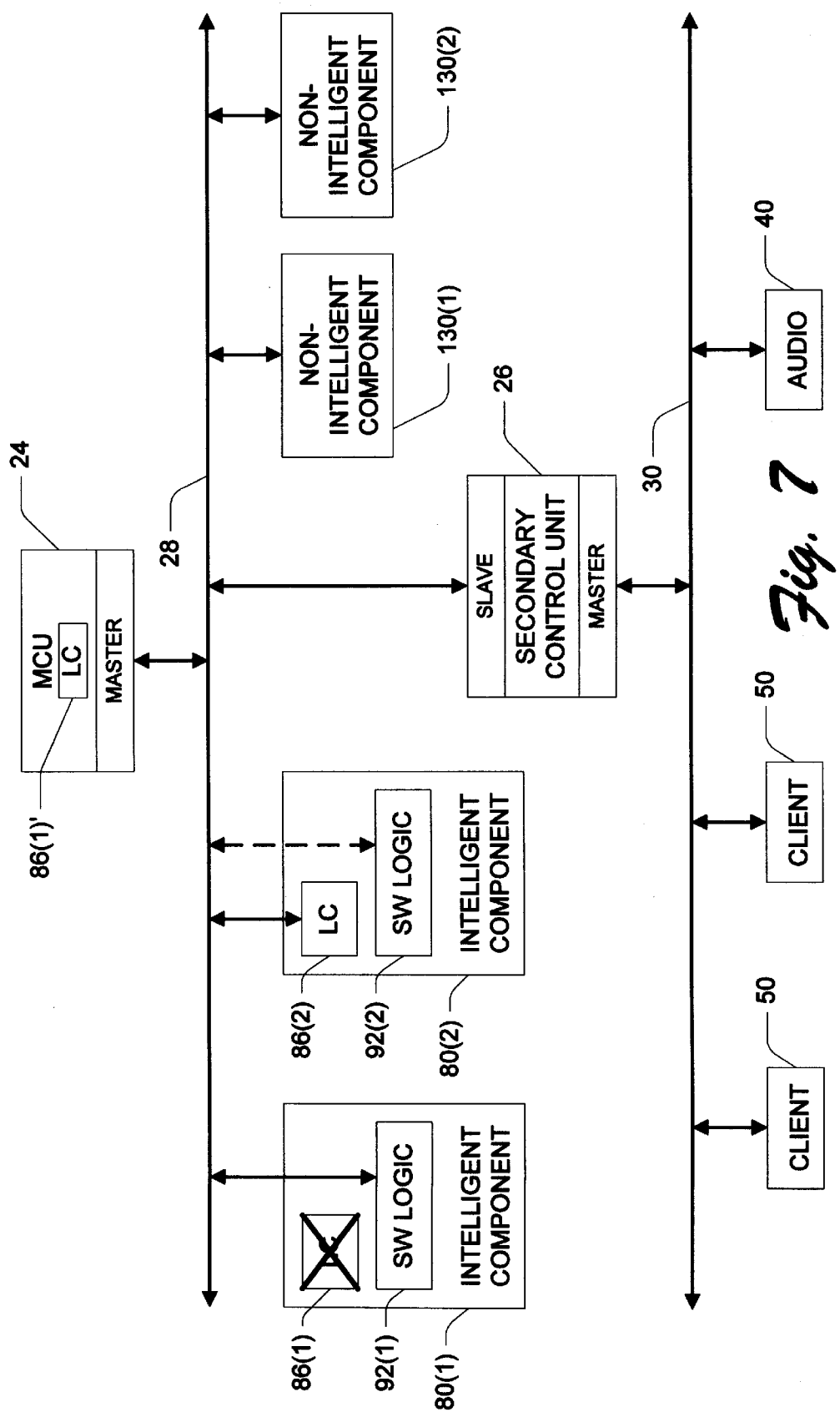
FIG. 7 is a block diagram similar to FIG. 6, but showing a failure of an electronic component.
Figure 8:
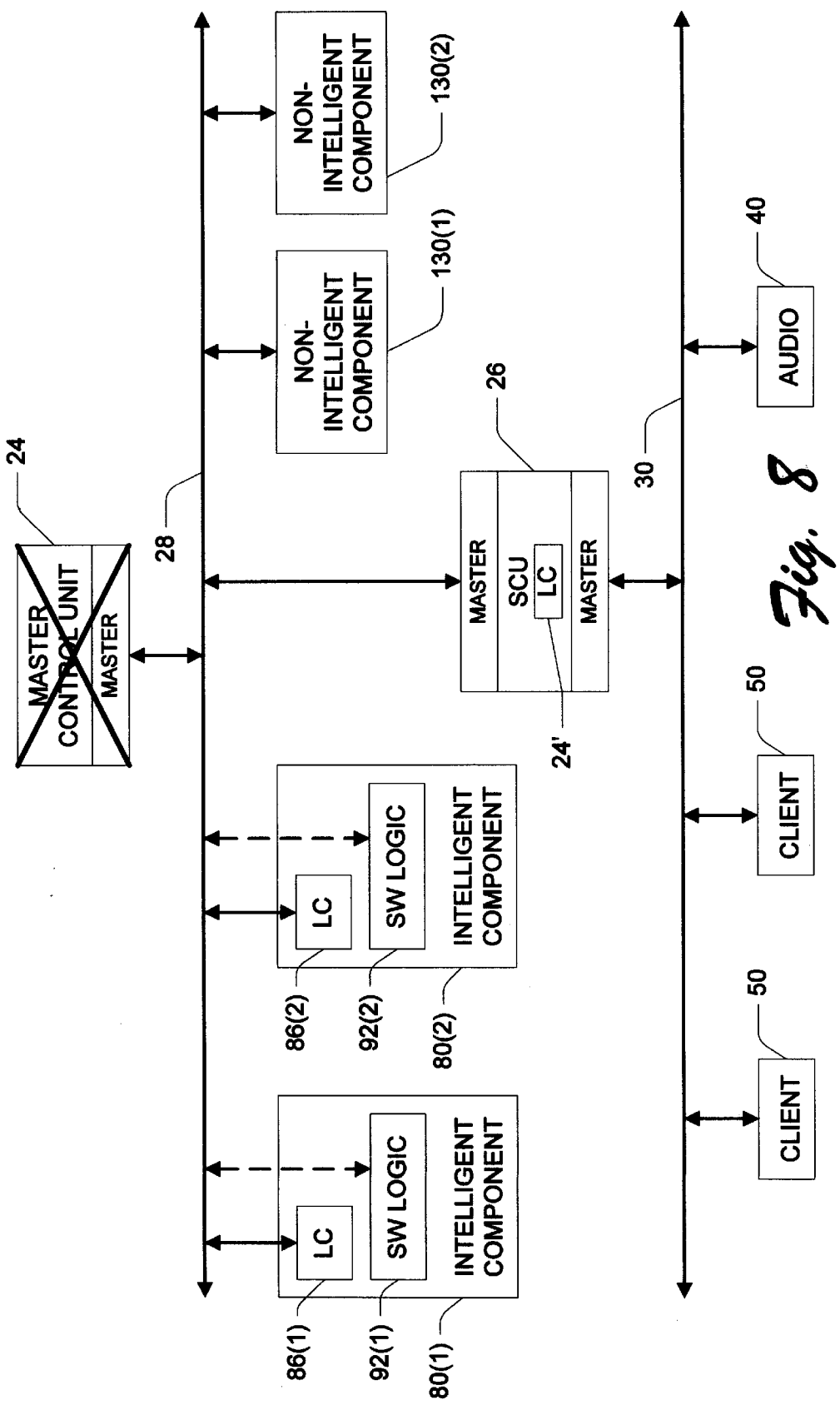
FIG. 8 is a block diagram similar to FIG. 6, but showing a failure of the master control unit.

FIGS. 6–8 show the fault tolerant control strategies implemented by the automobile control system. FIG. 6 shows the automobile control system 20 as having the MCU 24 and two intelligent electronic components 80(1), 80(2) and two non-intelligent components 130(1), 130(2) connected to the primary bus 28. The system further includes the SCU 26 connected to both the primary bus 28 and the support bus 30, and two clients 50 and the audio system 40 coupled to the support bus 30.

During normal operation, the master control unit 24 is master to the primary bus 28 and to the secondary control unit 26. The master control unit 24 manages the data flow over the primary bus 28 and performs the data processing and control functions for the non-intelligent components 130(1), 130(2). The MCU 24 continuously monitors the intelligent components 80(1), 80(2) to detect whether the local controllers 86(1), 86(2) are functioning properly. The MCU 24 and SCU 26 operate cooperatively, or independently, of one another in normal circumstances, except that the SCU 26 checks with the MCU 24 at regular intervals for signs of failure.

Because the MCU 24 controls all data communications on the primary bus 28, it also maintains the security and integrity of the primary bus 28 through continuous monitoring of messages sent by the electronic components, and particularly the SCU 26 since it is an open system. Should the SCU 26 become corrupted and attempt to gain unauthorized control of any electronic component on the primary bus 28, the MCU 24 will disable communication from the SCU 26 by altering its status in the configuration and routing tables. This action relegates the SCU 26 to a passive device which only receives messages and cannot transmit them over the primary bus 28. The MCU 24 will then attempt to select another candidate to designate as a surrogate secondary control unit, going through the process states 122 and 124 as described in FIG. 5.

FIG. 7 shows a case in which a local controller 86(1) fails. In the instance the local controller 86(1) fails, the switching logic 92(1) diverts data flow from the local controller 86(1) directly to the primary bus 28. The master control unit 24 assumes control of the component 80(1) using the component driver 86(1)' stored at the MCU 24. The MCU 24 assigns the highest execution priority to ensure uninterrupted performance of the failed component. For instance, if the microprocessor in the ABS fails, the MCU 24 assumes the functions of the ABS microprocessor and provides uninterrupted service to the ABS component. The MCU 24 continues to manage data flow between components on a resource available basis.

FIG. 8 shows a case in which the MCU 24 fails. The SCU 26 detects when the MCU 24 fails through continuous monitoring or alternatively through a non-maskable interrupt generated by the MCU 24 immediately prior to failure. When the MCU fails, the SCU 26 assumes the basic data flow management and control functions of the MCU 24, as well as the processing functions for non-intelligent components 130(1) and 130(2). The SCU 26 runs the local copy of the MCU code 26' to become the surrogate master of the primary bus 28 and the components 80(1), 80(2), 130(1), 130(2) connected thereto. In this implementation, however, the SCU 26 does not assume the functions of any failed local controller of a component on the vehicle bus. To ensure uninterrupted service to the components on the primary bus 28, the SCU 26 assigns the highest priority to performance of the basic data flow management and control function of the failed MCU 24, and performs all other functions on a resource available basis.

The fault-resilient automobile control system offers many advantages. It integrates the electronic components and facilitates data sharing and communication among them. The system also provides single point fault-tolerance in that every component and the master control unit can fail one time without loss of services. The system affords tremendous flexibility when installing system components in a vehicle. Each component or bus can be installed as an upgrade feature to provide full system functionality. When a new component is installed, a driver for that component is merely loaded at the MCU to enable backup in the event of failure.

The invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. A fault-resilient automobile control system for an automobile having multiple electronic automobile components, each electronic automobile component having a local controller for controlling operation of the electronic automobile component, the automobile control system comprising:

a master control unit electrically coupled to the electronic automobile components, the master control unit having a computer processor programmed to perform control tasks of the local controllers so that in an event that one of the local controllers fails, the master control unit controls the electronic automobile component in place of the failed local controller.

2. A fault-resilient automobile control system as recited in claim 1, wherein the master control unit has an open platform operating system executing on the computer processor.

3. A fault-resilient automobile control system as recited in claim 1, wherein the master control unit has a multitasking operating system executing on the computer processor.

4. A fault-resilient automobile control system as recited in claim 1, wherein the master control unit facilitates data communication among the electronic automobile components.

5. A fault-resilient automobile control system as recited in claim 1, wherein the master control unit maintains a routing table which the master control unit employs to route data detected by one electronic automobile component to one or more other electronic automobile components.

6. A fault-resilient automobile control system as recited in claim 1, wherein the master control unit monitors for failure of the local controllers of the electronic automobile components.

7. A fault-resilient automobile control system as recited in claim 1, wherein the master control unit has a memory and maintains a priority table in the memory, the priority table associating a priority rating with corresponding ones of the electronic automobile components, the master control unit handling the tasks of one or more failed local controllers in an order according to the priority ratings of the electronic automobile components in the priority table.

8. A fault-resilient automobile control system as recited in claim 1, in which the electronic automobile components further include non-intelligent components configured without local controllers, and wherein the master control unit performs data processing and control functions for the non-intelligent components.

9. An automobile comprising a fault-resilient automobile control system as recited in claim 1.

10. An automobile control system for an automobile having multiple electronic automobile components interconnected by a data communications network, each electronic automobile component having a local controller configured to perform one or more tasks, the automobile control system comprising:

a master control unit electrically coupled to the electronic automobile components via the data communications network, the master control unit having a computer processor programmed to manage data flow over the data communications network among the electronic automobile components; and the master control unit maintaining a routing table which the master control unit employs to route data detected by one electronic automobile component to one or more other electronic automobile components.

11. An automobile comprising an automobile control system as recited in claim 10.

12. A fault-resilient automobile control system for an automobile having multiple electronic automobile components, each electronic automobile component having a local controller for controlling operation of the electronic automobile component, the automobile control system comprising:

a master control unit electrically coupled to the electronic automobile components, the master control unit having a computer processor programmed to manage data flow among the electronic automobile components and to perform the tasks of the local controllers in an event that one or more of the local controllers fails; and a secondary control unit electrically coupled to the master control unit, the secondary control unit having a computer processor programmed to manage the data flow among the electronic automobile components in an event that the master control unit fails.

13. A fault-resilient automobile control system as recited in claim 12, wherein the master control unit has an open platform, multitasking operating system executing on the computer processor of the master control unit.

14. A fault-resilient automobile control system as recited in claim 12, wherein the master control unit monitors for failure of the local controllers of the electronic automobile components.

15. A fault-resilient automobile control system as recited in claim 12, wherein the master control unit has a memory and maintains a priority table in the memory, the priority table associating a priority rating with corresponding ones of the electronic automobile components, the master control unit handling the tasks of one or more failed local controllers in an order according to the priority ratings of the electronic automobile components in the priority table.

16. A fault-resilient automobile control system as recited in claim 12, in which the electronic automobile components further include non-intelligent components configured without local controllers, and wherein the master control unit performs data processing and control functions for the non-intelligent components.

17. A fault-resilient automobile control system as recited in claim 12, wherein the secondary control unit has an open platform, multitasking operating system executing on the computer processor of the secondary control unit.

18. A fault-resilient automobile control system as recited in claim 12, further comprising:

a dual bus data structure having a primary bus and a support bus;

the primary bus interconnecting the electronic automobile components, the master control unit, and the secondary control unit; and the support bus being connected to the secondary control unit for interfacing to one or more other devices.

19. A fault-resilient automobile control system as recited in claim 12, wherein:

the master control unit manages data flow among the electronic automobile components and the secondary control unit over a primary bus; and in an event that the secondary control unit attempts to gain unauthorized control of one of the electronic automobile components on the primary bus, the master control unit is configured to disable communication originating from the secondary control unit on the primary bus.

20. An automobile comprising a fault-resilient automobile control system as recited in claim 12.

21. A fault-resilient automobile control system for an automobile having multiple electronic automobile components interconnected by a data communications network, each electronic automobile component having a local controller configured to perform one or more tasks, the automobile control system comprising:

switching logic resident at ones of the electronic automobile components, the switching logic routing data to one of (1) the local controller of the electronic automobile component when the local controller is functioning properly or (2) the data communications network, circumventing the local controller, when the local controller is not functioning properly; and a master control unit coupled to the electronic automobile components via the data communication network, the master control unit having a computer processor programmed to perform the tasks of the local controllers; and in an event that a local controller of one of the electronic automobile components fails, the switching logic routes data to the master control unit via the data communication network bypassing the failed local controller and the master control unit performs the tasks of the failed local controller.

22. A fault-resilient automobile control system as recited in claim 21, wherein the master control unit has an open platform, multitasking operating system executing on the computer processor.

23. A fault-resilient automobile control system as recited in claim 21, wherein the master control unit facilitates data communication among the electronic automobile components.

24. A fault-resilient automobile control system as recited in claim 21, wherein the master control unit maintains a routing table which the master control unit employs to route data detected by one electronic automobile component to one or more other electronic automobile components.

25. A fault-resilient automobile control system as recited in claim 21, wherein the master control unit has a memory and maintains a priority table in the memory, the priority table associating a priority rating with corresponding ones of the electronic automobile components, the master control unit handling the tasks of one or more failed local controllers in an order according to the priority ratings of the electronic automobile components in the priority table.

26. An automobile comprising a fault-resilient automobile control system as recited in claim 21.

27. A fault-resilient automobile control system for an automobile having multiple electronic automobile components interconnected by a data communications network, each electronic automobile component having a local controller configured to perform one or more tasks, the automobile control system comprising:

switching logic resident at ones of the electronic automobile components, the switching logic routing data to one of (1) the local controller of the electronic automobile component when the local controller is functioning properly or (2) the data communications network, circumventing the local controller, when the local controller is not functioning properly;

a master control unit coupled to the electronic automobile components via the data communication network, the master control unit having a computer processor programmed to manage data flow among the electronic automobile components and to perform the tasks of the local controllers of the electronic automobile components;

a secondary control unit electrically coupled to the master control unit, the secondary control unit having a computer processor programmed to manage the data flow among the electronic automobile components;

in an event that a local controller of one of the electronic automobile components fails, the switching logic routes data to the master control unit via the data communication network and the master control unit performs the tasks of the failed local controller; and in an event that the master control unit fails, the secondary control unit manages the data flow among the electronic automobile components.

28. A fault-resilient automobile control system as recited in claim 27, wherein the master control unit has an open platform, multitasking operating system executing on the computer processor.

29. A fault-resilient automobile control system as recited in claim 27, wherein the master control unit has a memory and maintains a priority table in the memory, the priority table associating a priority rating with corresponding ones of the electronic automobile components, the master control unit handling the tasks of one or more failed local controllers in an order according to the priority ratings of the electronic automobile components in the priority table.

30. A fault-resilient automobile control system as recited in claim 27, wherein the secondary control unit has an open platform, multitasking operating system executing on the computer processor.

31. A fault-resilient automobile control system as recited in claim 27, wherein the secondary control unit is coupled to the master control unit via the data communications network, and further comprising a support bus independent of the data communications network, the support bus being connected to the secondary control unit for interfacing to one or more other devices.

32. A fault-resilient automobile control system as recited in claim 27, wherein in an event that the secondary control unit attempts to gain unauthorized control of one of the electronic automobile components on the data communications network, the master control unit is configured to disable communication originating from the secondary control unit on the data communications network.

33. An automobile comprising a fault-resilient automobile control system as recited in claim 27.

34. For an electronic automobile component having a sensor which generates data and a controller which uses the data to control operation of the automobile component, a switching logic interfaced with the sensor and the controller to selectively route data to one of (1) the controller when the controller is functioning properly or (2) an external data bus, circumventing the controller, when the controller is not functioning properly.

35. An electronic automobile component comprising the switching logic as recited in claim 34.

36. An automobile comprising the electronic automobile component as recited in claim 35.

37. A method for operating an automobile control system, comprising the following steps:

monitoring a plurality of local electronic controllers used to control associated automobile components; and in an event that one of the electronic controllers fails, remotely controlling the associated automobile component from a master control unit.

38. A method as recited in claim 37, wherein the master control unit manages data communication among the local electronic controllers, and further comprising the following additional steps:

monitoring the master control unit;

in an event that the master control unit fails, managing the data communication among the local electronic controllers from a secondary control unit.

39. A computer-readable medium having computer-executable instructions for performing the steps of the method as recited in claim 37.

40. A computer programmed to perform the steps of the method as recited in claim 37.

* * * * *